(12) United States Patent
Minwalla (10) Patent No.: US 8,904,431 B2
(45) Date of Patent: Dec. 2, 2014

(54) CURRENT DEVICE LOCATION ADVERTISEMENT DISTRIBUTION

(75) Inventor: Nosherwan Minwalla, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/973,415

(22) Filed: Dec. 20, 2010

(65) Prior Publication Data

US 2012/0159542 A1 Jun. 21, 2012

(51) Int. Cl.
| | |
|---|---|
| H04N 7/10 | (2006.01) |
| H04N 21/422 | (2011.01) |
| H04N 21/658 | (2011.01) |
| H04N 21/2668 | (2011.01) |
| H04N 21/262 | (2011.01) |
| H04N 21/258 | (2011.01) |
| H04N 21/81 | (2011.01) |
| H04N 21/414 | (2011.01) |

(52) U.S. Cl.
CPC ..... *H04N 21/2668* (2013.01); *H04N 21/42202* (2013.01); *H04N 21/6582* (2013.01); *H04N 21/26291* (2013.01); *H04N 21/25841* (2013.01); *H04N 21/812* (2013.01); *H04N 21/41407* (2013.01)
USPC ................ 725/36; 725/34; 709/219; 455/566

(58) Field of Classification Search
USPC ............................ 725/34–36; 455/566.1, 566; 709/217–232
See application file for complete search history.

(56) References Cited

U.S. PATENT DOCUMENTS

| | | | |
|---|---|---|---|
| 6,263,503 B1 | 7/2001 | Margulis | |
| 6,484,148 B1 * | 11/2002 | Boyd | ......................... 705/14.64 |
| 7,127,261 B2 | 10/2006 | Van Erlach | |
| 7,516,236 B2 | 4/2009 | Walsh et al. | |
| 7,873,703 B2 | 1/2011 | Bauchot et al. | |
| 7,962,182 B2 | 6/2011 | Kwan et al. | |
| 8,392,247 B2 | 3/2013 | Stevens | |
| 8,451,800 B2 | 5/2013 | Kovvali et al. | |

(Continued)

FOREIGN PATENT DOCUMENTS

| | | |
|---|---|---|
| CN | 1260890 | 7/2000 |
| CN | 1486568 | 3/2004 |

(Continued)

OTHER PUBLICATIONS

"Mobile DTV Systems", Retrieved from: <http://www.knk-mpeg.com/mobiletv.html> on Oct. 15, 2010, (2010),5 pages.

(Continued)

*Primary Examiner* — Annan Shang
(74) *Attorney, Agent, or Firm* — Micah Goldsmith; Glen Johnson; Micky Minhas (57) ABSTRACT

In embodiments of current device location advertisement distribution, a mobile network operator receives television content from a content service and can then communicate the television content to a client device via a wireless distribution point. A device location service determines that a current location of the client device is not within a geographic region associated with the client device, and updates the current location of the client device from location data that identifies the current location of the client device. The television content can then be updated for distribution to the client device along with advertisements that correspond to an advertising locale, which includes the current location of the client device.

20 Claims, 7 Drawing Sheets

(56) References Cited

U.S. PATENT DOCUMENTS

| | | | |
|---|---|---|---|
| 8,566,158 B2* | 10/2013 | Cansler et al. | 705/14.49 |
| 8,593,954 B2 | 11/2013 | Zhuang | |
| 2005/0026561 A1 | 2/2005 | Shklarsky et al. | |
| 2007/0288638 A1 | 12/2007 | Vuong et al. | |
| 2008/0025245 A1 | 1/2008 | Sweeney et al. | |
| 2008/0092201 A1 | 4/2008 | Agarwal et al. | |
| 2008/0155591 A1* | 6/2008 | Mahajan et al. | 725/34 |
| 2009/0093259 A1 | 4/2009 | Edge et al. | |
| 2009/0094113 A1* | 4/2009 | Berry et al. | 705/14 |
| 2010/0008290 A1 | 1/2010 | Fischer | |
| 2010/0094878 A1* | 4/2010 | Soroca et al. | 707/748 |
| 2010/0146135 A1 | 6/2010 | Evans et al. | |
| 2010/0229205 A1 | 9/2010 | Hakusui | |
| 2012/0159555 A1 | 6/2012 | Minwalla | |
| 2013/0315066 A1 | 11/2013 | Xu et al. | |

FOREIGN PATENT DOCUMENTS

| | | |
|---|---|---|
| CN | 1859148 | 11/2006 |
| CN | 101193408 | 6/2008 |
| CN | 20090094113 | 4/2009 |
| CN | 101557555 | 10/2009 |
| CN | 101658012 | 2/2010 |
| CN | 101821972 | 9/2010 |
| CN | 101895816 | 11/2010 |
| JP | 2001359166 | 12/2001 |

OTHER PUBLICATIONS

Sjoberg, Daniel "Content Delivery Networks: Ensuring quality of experience in streaming media applications", *TeliaSonera International Carrier, CDN white paper*, Available at <http://www.csimagazine.com/csi/whitepapers/Whiteppr_CDN_080814_highres.pdf>,(Aug. 14, 2008),pp. 1-19.

Liu, et al., "Proxy Caching for Media Streaming Over the Internet", Retrieved at <<http://140.127.22.92/download/learn_web/Tong%2897-1%29--Multimedia_Comm/pdf/Proxy%20Caching%20for%20Media%20Streaming%20Over%20the%20Internet.pdf>>, Aug. 2004, pp. 7.

Li, et al., "Proxy-Driven Rate-Distortion Optimized Video Streaming Over", Retrieved at <<http://www.ece.ucdavis.edu/~chuah/paper/pv2004-minestrone.pdf>>, 2004, pp. 9.

"Proxy Caching for Robust Video Delivery over Lossy Networks", Retrieved at <<http://deposit.ddb.de/cgi-bin/dokserv?idn=972714316&dok_var=d1&dok_ext=pdf&filename=972714316.pdf>>,Sep. 2004, pp. 193.

Kyriakidou, et al., "Video Streaming for Fast Moving Users in 3G Mobile Networks", Retrieved at <<http://cgi.di.uoa.gr/~ad/Publications/MobiDE05.pdf>>, Jun. 12, 2005, pp. 8.

Gomaa, et al., "Media Caching Support for Mobile Transit Clients", Retrieved at <<http://pages.cpsc.ucalgary.ca/~carey/papers/2009/Hazem-WiMob2009.pdf>>,2009, pp. 6.

Liu, Jiangchuan, "Streaming Media Caching", Retrieved at <<http://www.cs.sfu.ca/~jcliu/Papers/chapter-Oct-06.pdf>>, 2005, pp. 16.

"Delivering Live and On-Demand Smooth Streaming", Retrieved at <<http://download.microsoft.com/download/4/E/5/4E599FBB-6E34-4A74-B3C5-1391CB0FD55F/Delivering_Live_and_On-Demand_Smooth_Streaming.pdf>>, pp. 28.

"Final Office Action", U.S. Appl. No. 12/973,506, Sep. 21, 2012, 8 pages.

"Non-Final Office Action", U.S. Appl. No. 12/973,506, Jul. 23, 2012, 7 pages.

"Foreign Office Action", CN Application No. 201110427604.0, Dec. 9, 2013, 16 pages.

"Foreign Office Action", CN Application No. 201110428686.0, Dec. 25, 2013, 17 pages.

"Foreign Office Action", CN Application No. 201110428686.0, Jun. 5, 2014, 11 pages.

"Foreign Office Action", CN Application No. 201110427604.0, May 26, 2014, 17 pages.

"Notice of Allowance", U.S. Appl. No. 12/973,506, May 23, 2014, 8 pages.

* cited by examiner

CURRENT DEVICE LOCATION ADVERTISEMENT DISTRIBUTION

BACKGROUND

Television content delivered over an Internet connection is an increasingly popular technology. In addition to short video clips and recorded movies, live television can be distributed via the Internet, and television programming can be streamed to a portable device, such as mobile phone or computer device. However, there remains bandwidth limitations to delivering live television and video content in real-time, particularly through telco and mobile operator networks that distribute television content to client devices via wireless communication.

Additionally, television content typically includes national and/or local advertisements. Local advertisements are generally distributed within a fixed geographic area, and are intended to reach potential consumers of goods and services within the designated, fixed geographic area. However, portable devices may receive television content and advertisements when moved through many different geographic advertising areas, while local advertising to a device remains constrained to a fixed geographic area.

SUMMARY

This summary is provided to introduce simplified concepts of current device location advertisement distribution. The simplified concepts are further described below in the Detailed Description. This summary is not intended to identify essential features of the claimed subject matter, nor is it intended for use in determining the scope of the claimed subject matter.

In embodiments of wireless distribution system proxy caches, a mobile network operator receives requests for television content from client devices, and communicates one of the requests to a content service that provides the television content for distribution to the client devices. Proxy caches are implemented to cache content data of the television content prior to the cached content data of the television content being wirelessly communicated to the client devices. The proxy caches are located at wireless distribution points of the mobile network operator, and the wireless distribution points communicate the cached content data of the television content from the proxy caches to the client devices. A wireless distribution point emulates television multicast when the cached content data of the television content is communicated from a proxy cache to multiple client devices.

In embodiments of current device location advertisement distribution, a mobile network operator receives television content from a content service and can then communicate the television content to a client device via a wireless distribution point. A device location service determines that a current location of the client device is not within a geographic region associated with the client device. The geographic region that is associated with the client device may be based on a service contract with a user of the client device, or a billing zip code associated with the user of the client device.

The device location service updates the current location of the client device from location data that identifies the current location of the client device. The location data can include GPS location data or regional position data that correlates to the current location of the client device. The television content can then be updated for distribution to the client device along with advertisements that correspond to an advertising locale, which includes the current location of the client device. The device location service can also update the advertising locale for the client device as the client device is moved from one region to another.

BRIEF DESCRIPTION OF THE DRAWINGS

Embodiments of wireless distribution system proxy caches and current device location advertisement distribution are described with reference to the following drawings. The same numbers are used throughout the drawings to reference like features and components.

DETAILED DESCRIPTION

In embodiments, a mobile network operator controls distribution of television content to various client devices via wireless distribution points. The mobile network operator receives requests for television content from client devices, and communicates one of the requests (as opposed to all of the requests) to a content service that provides the television content for distribution to the client devices. The content service can also provide advertisements along with the television content for distribution to the client devices. Proxy caches are located at aggregation points and at the wireless distribution points of the mobile network operator to cache content data of the television content, and/or to cache advertisements, prior to the cached content data being wirelessly communicated to the client devices. A wireless distribution point emulates television multicast when the cached content data of the television content is communicated from a proxy cache to multiple client devices.

The advertisements are generally directed to client devices that receive television content within a designated region or geographic area, and are intended to reach potential consumers of goods and services within the designated local region or geographic area, referred to herein as an advertising locale. However, if a client device is moved from one advertising locale to another, such as from one city to a city in another state, the local advertisements that correspond to a geographic region associated with the client device are likely not useful to a user of the device in the different advertising locale. A current location of a client device can be determined from location data that identifies the current location of the client device. The location data can include GPS location data or regional position data that correlates to the current location of the client device. The television content can then be updated for distribution to the client device along with targeted local advertisements that correspond to the current location and/or advertising locale of the client device.

While features and concepts of the described systems and methods for current device location advertisement distribution can be implemented in any number of different environments, systems, devices, and/or various configurations, embodiments of current device location advertisement distribution are described in the context of the following example devices, systems, and configurations.

Figure 1:
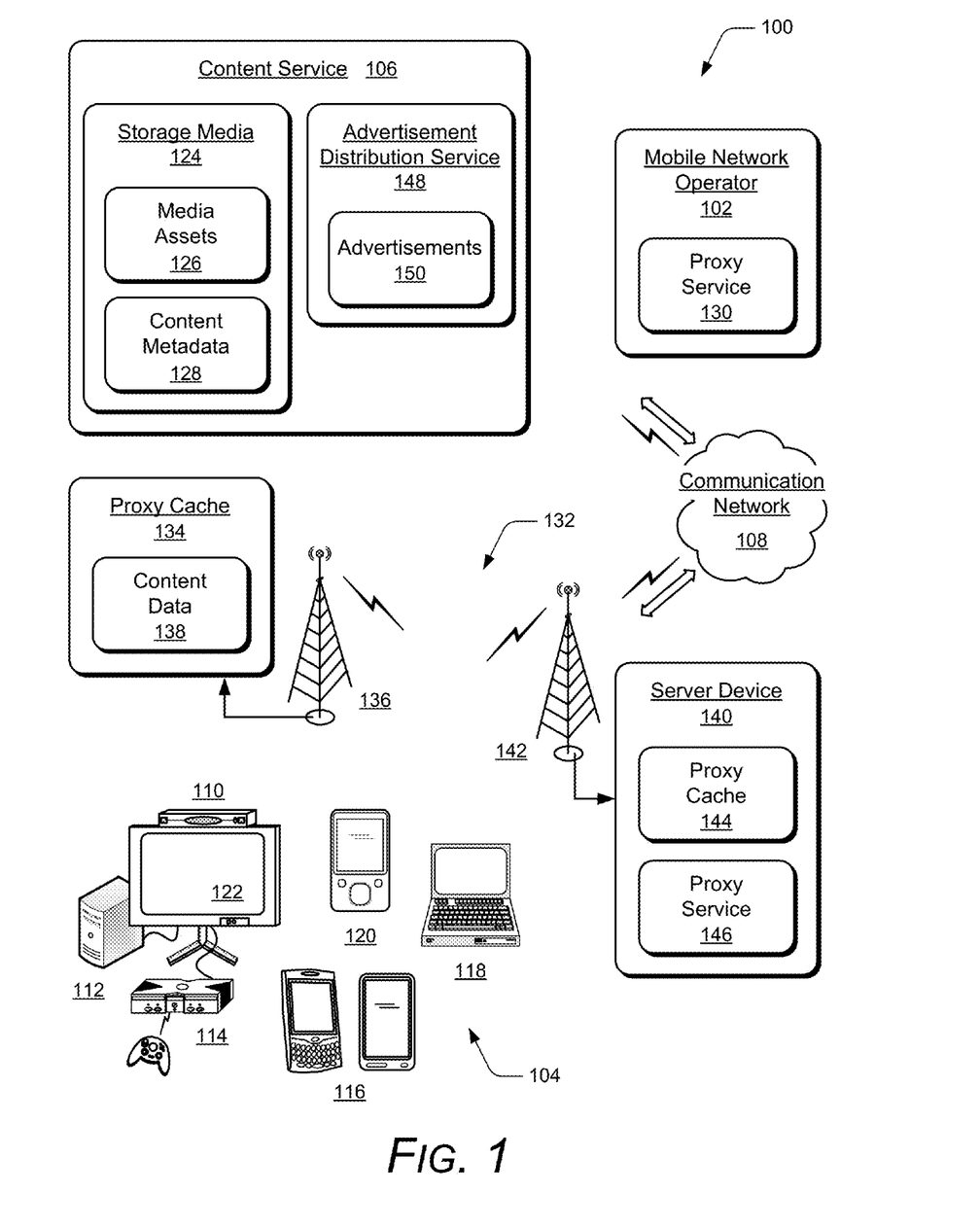
FIG. 1 illustrates an example system in which embodiments of wireless distribution system proxy caches and current device location advertisement distribution can be implemented.

FIG. 1 illustrates an example system 100 in which various embodiments of wireless distribution system proxy caches and current device location advertisement distribution can be implemented. The example system 100 includes a mobile network operator 102, such as a cell-phone provider and/or Internet service provider that facilitates mobile data and/or voice communications for any type of various client devices 104. The client devices include fixed and/or mobile devices that may be subscriber devices of the mobile network operator, and are configured to receive television content via wireless communication. The example system 100 also includes a content service 106 and/or other media content sources that communicate or otherwise provide media content and data to any number of the various client devices 104 via the mobile network operator 102 and a communication network 108.

The various client devices 104 may be implemented with any number and combination of differing components as further described with reference to the example device shown in FIG. 7. In this example, a client device 104 can be implemented as any one or combination of a television client device 110, a computer device 112, a gaming system 114, an appliance device, an electronic device, and/or as any other type of device that may be implemented to receive media content in any form of audio, video, and/or image data.

The various client devices 104 can also include wireless devices implemented to receive and/or communicate wireless data, such as any one or combination of a mobile phone 116 (e.g., cellular, VoIP, WiFi, etc.), a portable computer device 118, a media player device 120, and/or any other wireless device that can receive media content in any form of audio, video, and/or image data. A client system can include a respective client device and display device 122 that together render or playback any form of audio, video, and/or image media content and media assets. The display device can be implemented as any type of a television, high definition television (HDTV), LCD, or similar display system.

Any of the services and devices can communicate via the communication network 108, which can be implemented to include a wired and/or a wireless network that facilitates data communication. The communication network can also be implemented using any type of network topology and/or communication protocol, and can be represented or otherwise implemented as a combination of two or more networks, to include IP-based networks and/or the Internet. The communication network may also include mobile operator networks that are managed by the mobile network operator 102 and/or other mobile operators, such as a communication service provider, cell-phone provider, and/or Internet service provider.

The content service 106 can include media content servers to communicate, or otherwise distribute, media content and/or other data to the various client devices via the mobile network operator 102. In this example system 100, the content service includes storage media 124 to store or otherwise maintain various media content and data, such as media assets 126 (e.g., also referred to as television content and/or media content) and associated content metadata 128. The storage media can be implemented as any type of memory and/or suitable electronic data storage.

The media assets 126 can include any type of audio, video, and/or image data received from any type of media content source or data source. As described throughout, media assets are media content, and media assets can include music (e.g., digital music files of songs), television programming, movies, on-demand media assets, interactive games, network-based applications, and any other audio, video, and/or image data (e.g., to include program guide data, user interface data, advertising content, closed captions data, content metadata, search results and/or recommendations, etc.). A media asset may also include various display formats of the media asset, such as a high-definition display format and lower quality display formats.

The content metadata 128 can include any type of identifying criteria, descriptive information, and/or attributes associated with the media assets 126 that describes and/or categorizes the media assets. For example, metadata can include a media asset identifier, title, subject description, a date of production, artistic information, music compilations, and any other types of descriptive information about a particular media asset. Further, metadata can characterize a genre that describes a media asset, such as video content, as being an advertisement, a movie, a comedy show, a sporting event, a news program, a sitcom, a talk show, an action/adventure program, or as any number of other category descriptions.

In this example system 100, the mobile network operator 102 includes a proxy service 130 that can be implemented as computer-executable instructions, such as a software application, and executed by one or more processors to implement the various embodiments described herein. Alternatively or in addition, the proxy service may be implemented as an independent service separate from the mobile network operator. In embodiments, the proxy service is implemented to manage the television content distribution to the various client devices 104.

The proxy service 130 at the mobile network operator 102 receives requests for television content from one or more of the client devices 104. The proxy service can then initiate the mobile network operator to communicate one of the requests from the client devices (as opposed to all of the requests) to the content service 106 that provides the television content (e.g., the media assets 126) to the mobile network operator for distribution to the client devices. In an implementation, the first client device that requests the television content, such as a television program or movie, initiates content data being distributed downstream from the content service, via the mobile network operator, to a proxy cache at a wireless distribution point.

The example system 100 includes wireless distribution points 132 of the mobile network operator 102 via which the requested television content can be wirelessly communicated to the client devices 104. Proxy caches are located at the wireless distribution points, such as proxy cache 134 located at the wireless distribution point 136. The proxy cache may be implemented as an HTTP proxy cache that caches content data 138 of the requested television content when received via the Internet. The mobile network operator 102 can receive the content data of the requested television content from the content service 106 via the Internet (e.g., via the communication network 108). The content data can be received as video fragments of the television content that are packetized for smooth streaming at the content service.

The proxy caches at the wireless distribution points 132 cache the content data 138 of the television content prior to the cached content data being wirelessly communicated to the client devices 104. In embodiments, the content data is cached at a proxy cache that is located at a wireless distribution point that has a wireless communication link with a client device that requested the television content. The wireless distribution points of the mobile network operator communicate the cached content data of the television content from the proxy caches to the client devices. In this manner, a wireless distribution point can emulate television multicast when the cached content data of the television content is communicated from a proxy cache to multiple client devices.

Similar to the proxy cache 134 located at the wireless distribution point 136, a server device 140 can be located at a wireless distribution point 142 of the mobile network operator 102. The server device includes a proxy cache 144 to cache content data of the requested television content, such as described with reference to the proxy cache 134. In embodiments, the server device may optionally include a proxy service 146, such as described with reference to the proxy service 130 at the mobile network operator. The proxy service 146 can receive requests for television content from one or more of the client devices 104, and then communicate one of the requests to the content service 106 that provides the television content as content data for distribution to the client devices. The proxy cache 144 caches the content data of the television content at the wireless distribution point 142 prior to the cached content data of the television content being wirelessly communicated to the client devices.

In embodiments, the mobile network operator 102 and/or the server device 140 first receives a request for the television content from one or more of the client devices 104, and then caches the content data of the requested television content. Alternatively, content data for additional television content can be received from the content service 106 before a request for the additional television content is received from a client device. The proxy caches 134, 144 can then cache the content data prior to the additional television content being requested and wirelessly communicated to the client devices.

In this example system 100, the content service 106 also includes an advertisement distribution service 148 that can be implemented as computer-executable instructions, such as a software application, and executed by one or more processors to implement the various embodiments described herein. Alternatively or in addition, the advertisement distribution service 148 may be implemented as an independent service separate from the content service. In embodiments, the advertisement distribution service is implemented to manage the distribution of advertisements 150 along with the television content to the various client devices 104. The advertisements may be targeted local advertisements that correspond to the current location of a particular client device and/or the advertisements are targeted local advertisements that correspond to an advertising locale, which includes the current location of the client device.

Figure 2:
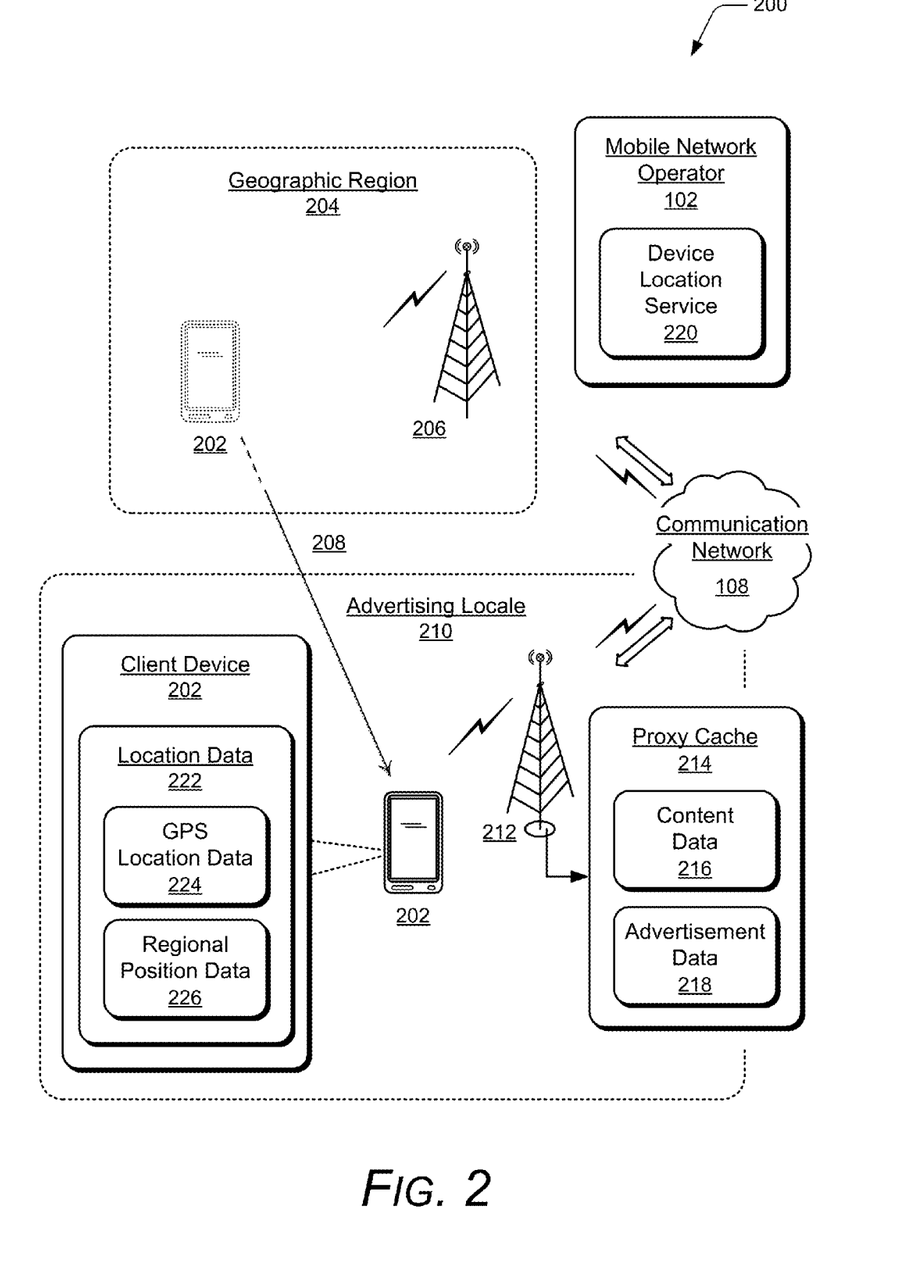
FIG. 2 illustrates another example system in which embodiments of current device location advertisement distribution can be implemented.

FIG. 2 illustrates an example system 200 in which various embodiments of current device location advertisement distribution can be implemented. The example system 200 includes the mobile network operator 102, communication network 108, and examples of wireless distribution points as described with reference to FIG. 1. As described above, the mobile network operator can receive television content (e.g., the media assets 126) from the content service 106, along with national and/or local advertisements 150. Local advertisements are generally directed to client devices that receive television content within a designated region or geographic area, and are intended to reach potential consumers of goods and services within the designated local region or geographic area, referred to herein as an advertising locale.

The mobile network operator 102 can then communicate the television content along with the advertisements to a client device via a wireless distribution point. For example, a client device 202 is located in a geographic region 204 that is covered for wireless communication with the mobile network operator by at least the wireless distribution point 206. The geographic region that is associated with the client device may be based on a service contract with a user of the client device, or a billing zip code associated with the user of the client device. However, if the client device is moved at 208 from one advertising locale to another, such as from the geographic region 204 to a different advertising locale 210, the local advertisements that correspond to the geographic region associated with the client device are likely not useful to a user of the device in the different advertising locale. For example, a business person may travel from his or her home city to a city in another state. While viewing television content on the client device 202, targeted local advertisements can be received that correspond to the current location and/or advertising locale of the client device, rather than advertisements that are local to the person's home city.

In the example system 200, the client device 202 has a current location within advertising locale 210, which is covered for wireless communication with the mobile network operator 102 by at least the wireless distribution point 212. As described with reference to FIG. 1, a proxy cache 214 is located at the wireless distribution point to cache the content data 216 of the television content prior to the cached content data being wirelessly communicated to the client device 202. In this example, the proxy cache can also cache advertisement data 218 of the advertisements that correspond to the advertising locale 210 for distribution to the client device along with the television content.

The mobile network operator 102 includes a device location service 220 that can be implemented as computer-executable instructions, such as a software application, and executed by one or more processors to implement the various embodiments described herein. Alternatively or in addition, the device location service may be implemented as an independent service separate from the mobile network operator. In embodiments, the device location service is implemented to determine that a current location of the client device 202 is not within the geographic region 204 that is associated with the client device. The device location service can then also determine the advertising locale 210 that includes the current location of the client device, and/or update the advertising locales as the client device is moved from one region to another.

The device location service 220 at the mobile network operator 102 can determine the current location of the client device 202 from location data 222 that identifies the current location of the device. The location data can include GPS location data 224 and/or regional position data 226 that correlates to the current location of the client device. The regional position data can indicate the current location of the client device based on communications via cellular towers (e.g., the wireless distribution points) or other network communication equipment that has a known location relative to an approximate location of the device. The location of a mobile phone or portable computer, for example, can be monitored for a change in location, such as from one advertising locale to another.

Figure 3:
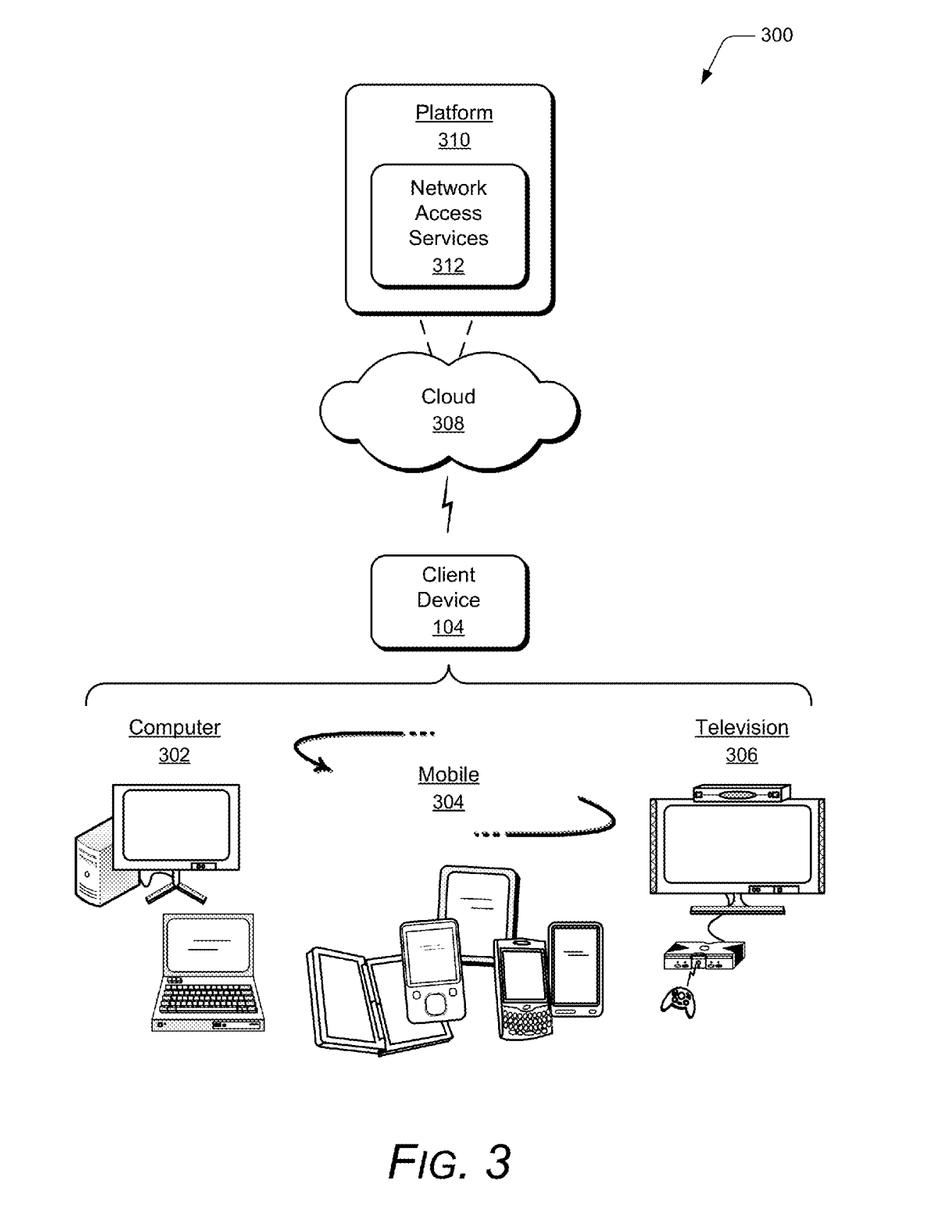
FIG. 3 illustrates an example system with multiple devices for a seamless user experience in ubiquitous environments.

FIG. 3 illustrates an example system 300 that includes a example client device 104 as described with reference to FIG. 1. The example system 300 enables ubiquitous environments for a seamless user experience when using any type of computer, television, and/or mobile device. Services and applications run substantially similar in all environments for a common user experience when transitioning from one device to the next while utilizing an application, playing a video game, watching a video and television content, listening to music, and so on.

In the example system 300, multiple devices can be interconnected through a central computing device or system, which may be local to the multiple devices or may be located remotely from the multiple devices. In one embodiment, the central computing device may be a cloud of one or more server computers that are connected to the multiple devices through a network, the Internet, or other data communication link. In embodiments, this interconnection architecture enables functionality across multiple devices to provide a common and seamless experience to a user of the multiple devices. Each of the devices may have different physical configurations and capabilities, and the central computing device uses a platform to enable delivery of an experience that is both tailored to a particular device and yet common to all of the devices. In embodiments, a class of target devices is created and user experiences are tailored to the generic class of devices. A class of devices may be defined by physical features, types of usage, or other common characteristics of the devices.

In various implementations, the client device 104 may be implemented in a variety of different configurations, such as for computer 302, mobile 304, and television 306 uses. Each of these configurations includes devices that may have generally different constructs and capabilities, and the client device may be configured according to one or more of the different device classes. For example, the client device may be implemented as any type of a personal computer, desktop computer, a multi-screen computer, laptop computer, tablet, netbook, and so on.

The client device 104 may also be implemented as any type of mobile device, such as a mobile phone, portable music player, portable gaming device, a tablet computer, a multi-screen computer, and so on. The client device may also be implemented as any type of television device having or connected to generally larger display screens in casual viewing environments. These devices include televisions, set-top boxes, gaming consoles, and so on. The techniques described herein may be supported by these various configurations of the client device and are not limited to the specific examples of the embodiments described herein.

The cloud 308 includes and/or is representative of a platform 310 for network access services 312. The platform abstracts underlying functionality of hardware, such as server devices, and/or software resources of the cloud. The network access services may include applications and/or data that can be utilized while computer processing is executed on servers that are remote from the client device. For example, the network access services may include the content service 106, the proxy service 130, the advertisement distribution service 148, and/or the device location service 220 as described with reference to FIGS. 1 and 2. The network access services 312 can be provided as a service over the Internet and/or through a subscriber network, such as a cellular or WiFi network.

Example methods 400, 500, and 600 are described with reference to respective FIGS. 4, 5, and 6 in accordance with one or more embodiments of wireless distribution system proxy caches and current device location advertisement distribution. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
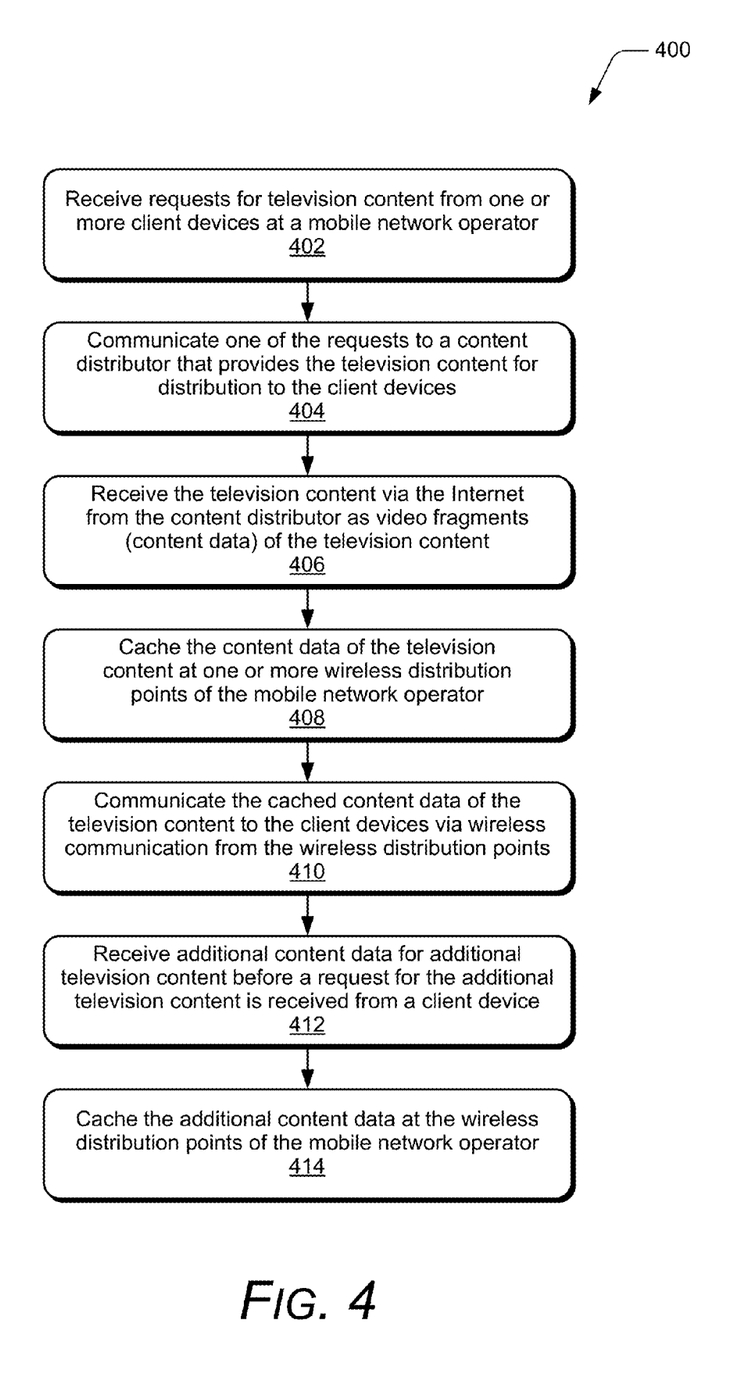
FIG. 4 illustrates example method(s) of wireless distribution system proxy caches in accordance with one or more embodiments.

FIG. 4 illustrates example method(s) 400 of wireless distribution system proxy caches. The order in which the method blocks are described are not intended to be construed as a limitation, and any number of the described method blocks can be combined in any order to implement a method, or an alternate method.

At block 402, requests for television content are received from one or more client devices at a mobile network operator. For example, the proxy service 130 (FIG. 1) at the mobile network operator 102 receives requests for television content from one or more of the client devices 104. Alternatively or in addition, the server device 140 at the wireless distribution point 142 includes the proxy service 146 that receives requests for the television content from one or more of the client devices.

At block 404, one of the requests is communicated to a content service that provides the television content to the mobile network operator for distribution to the client devices. For example, the proxy service 130 initiates the mobile network operator 102 to communicate one of the requests from the client devices (as opposed to all of the requests) to the content service 106 that provides the television content (e.g., the media assets 126) to the mobile network operator for distribution to the client devices.

At block 406, the television content is received via the Internet from the content service as video fragments of the television content. For example, the mobile network operator 102 receives content data 138 of the television content as video fragments from the content service 106 via the Internet (e.g., via the communication network 108). The video fragments of the television content can be packetized for smooth streaming at the content service.

At block 408, content data of the television content is cached at one or more wireless distribution points of the mobile network operator. For example, the proxy cache 134 at the wireless distribution point 136 caches the content data 138 of the television content prior to the cached content data being wirelessly communicated to the client devices 104. In embodiments, the content data of the television content is cached with HTTP proxy caches when the content data is received via the Internet. Additionally, the content data is cached at a proxy cache that is located at a wireless distribution point that has a wireless communication link with a client device that requested the television content.

At block 410, the cached content data of the television content is communicated to the client devices via wireless communication from the wireless distribution points. For example, the wireless distribution point 136 of the mobile network operator 102 communicates the cached content data 138 of the television content from the proxy cache 134 to the client devices 104. In this manner, the wireless distribution point emulates television multicast when the cached content data of the television content is communicated from the proxy cache to multiple client devices.

At block 412, additional content data for additional television content is received before a request for the additional television content is received from a client device. At block 414, the additional content data is cached at the one or more wireless distribution points of the mobile network operator. For example, the mobile network operator 102 receives content data for additional television content from the content service 106 before a request for the additional television content is received from a client device. The proxy caches 134, 144 can then cache the content data prior to the additional television content being requested and wirelessly communicated to the client devices.

Figure 5:
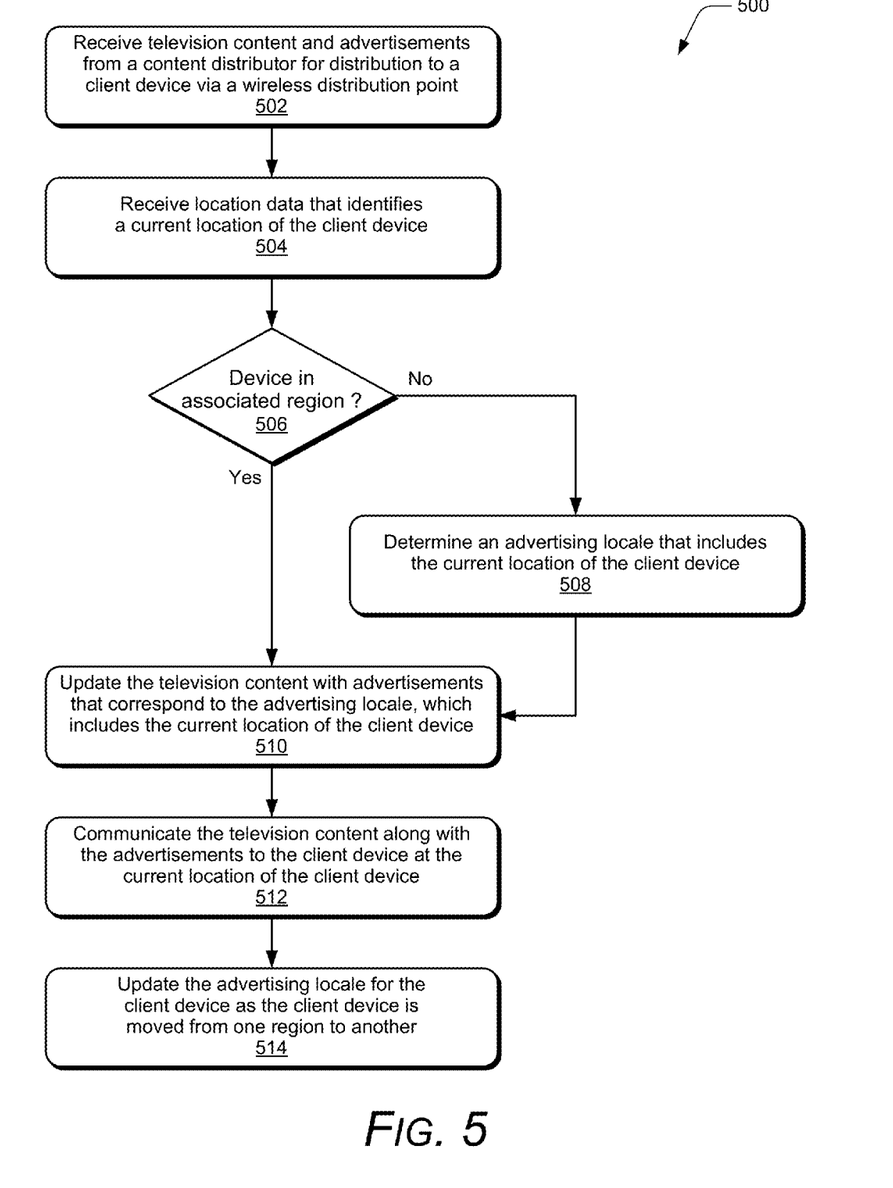
FIG. 5 illustrates example method(s) of current device location advertisement distribution in accordance with one or more embodiments.

FIG. 5 illustrates example method(s) 500 of current device location advertisement distribution, and is described with reference to a mobile network operator. The order in which the method blocks are described are not intended to be construed as a limitation, and any number of the described method blocks can be combined in any order to implement a method, or an alternate method.

At block 502, television content and advertisements are received from a content service for distribution to a client device via a wireless distribution point. For example, the mobile network operator 102 (FIG. 1) receives television content (e.g., the media assets 126) from the content service 106, along with national and/or local advertisements 150. The television content can include local advertisements that correspond to a geographic region associated with the client device.

At block 504, location data is received that identifies a current location of the client device. For example, the device location service 220 (FIG. 2) at the mobile network operator 102 receives the location data 222 from the client device 202, and the location data identifies the current location of the device. The location data can include GPS location data 224 and/or regional position data 226 that correlates to the current location of the client device. The regional position data can indicate the current location of the client device based on communications via cellular towers (e.g., the wireless distribution points) or other network communication equipment that has a known location relative to an approximate location of the device.

At block 506, a determination is made as to whether the client device is located within a geographic region that is associated with the device. For example, the client device 202 may be located within the geographic region 204 that is associated with the device. The geographic region that is associated with the client device may be based on a service contract with a user of the client device, and/or a billing zip code associated with the user of the client device. If the current location of the client device is not within the geographic region that is associated with the client device (i.e., "no" from block 506), then at block 508, an advertising locale that includes the current location of the client device is determined For example, the device location service 220 determines that the current location of the client device 202 is within the advertising locale 210.

If the current location of the client device is within the geographic region (also an advertising locale) that is associated with the client device (i.e., "yes" from block 506), or continuing from block 508, then at block 510, the television content is updated with advertisements that correspond to the advertising locale, which includes the current location of the client device. For example, the television content is updated with targeted local advertisements that correspond to the current location and/or the advertising locale of the client device.

At block 512, the television content along with the advertisements is communicated to the client device at the current location of the client device. For example, the wireless distribution point 212 of the mobile network operator 102 communicates the television content (e.g., the cached content data 216) along with targeted local advertisements (e.g., the advertisement data 218) to the client device at the current location within the advertising locale 210. At block 514, the advertising locale for the client device is updated as the client device is moved from one region to another. For example, the device location service 220 updates the advertising locales as the client device is moved from one region to another.

Figure 6:
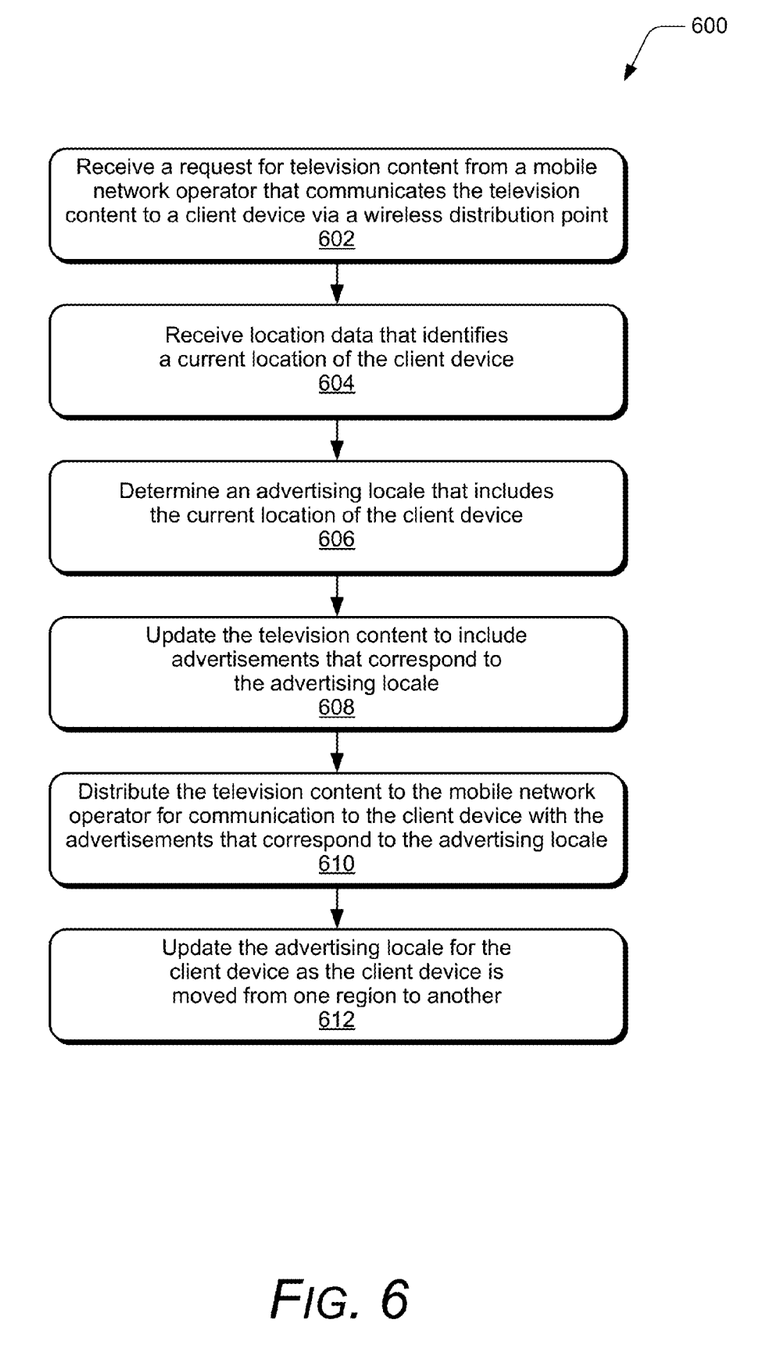
FIG. 6 illustrates additional example method(s) of current device location advertisement distribution in accordance with one or more embodiments.

FIG. 6 illustrates example method(s) 600 of current device location advertisement distribution, and is described with reference to a content service. The order in which the method blocks are described are not intended to be construed as a limitation, and any number of the described method blocks can be combined in any order to implement a method, or an alternate method.

At block 602, a request for television content is received from a mobile network operator that communicates the television content to a client device via a wireless distribution point. For example, the content service 106 (FIG. 1) receives a request for television content (e.g., media assets 126) from the mobile network operator 102 that then communicates the television content to a client device 104 via a wireless distribution point 132. At block 604, location data is received that identifies a current location of the client device. For example, the content service 106 receives the location data 222 (FIG. 2) from the client device, and the location data identifies the current location of the device. The location data can include GPS location data 224 and/or regional position data 226 that correlates to the current location of the client device.

At block 606, an advertising locale is determined that includes the current location of the client device. For example, the advertisement distribution service 148 at the content service 106 determines that the current location of the client device 202 is within the advertising locale 210. At block 608, the television content is updated to include advertisements that correspond to the advertising locale. For example, the advertisement distribution service 148 at the content service 106 updates television content to include targeted local advertisements that correspond to the current location and/or advertising locale of the client device.

At block 610, the television content is distributed to the mobile network operator for communication to the client device along with the advertisements that correspond to the advertising locale. For example, the content service 106 distributes the television content (e.g., media assets 126) along with the advertisements 150 to the mobile network operator 102 for wireless communication to the client device. At block 612, the advertising locale for the client device is updated as the client device is moved from one region to another. For example, the advertisement distribution service 148 continues to receive location data that identifies a current location of the client device (e.g., at block 604), and updates the advertising locale that includes the current location of the client device (e.g., at block 606).

Figure 7:
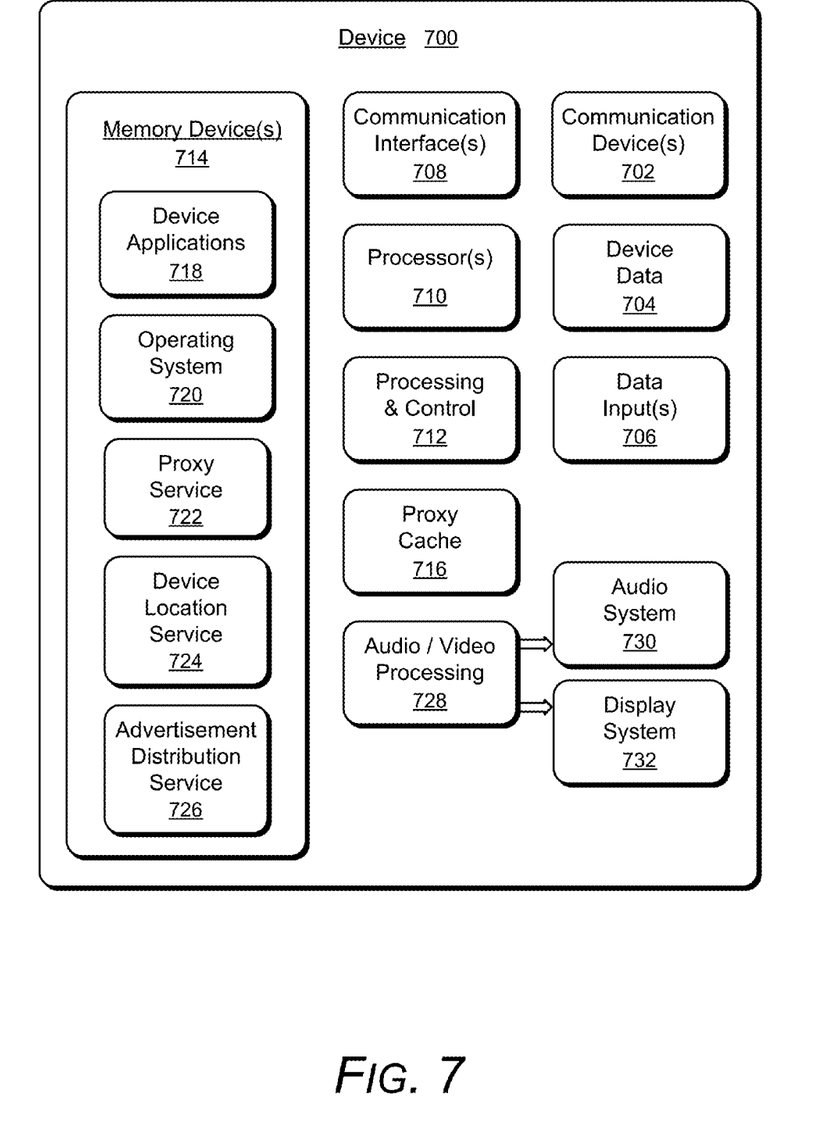
FIG. 7 illustrates various components of an example device that can implement embodiments of wireless distribution system proxy caches and current device location advertisement distribution.

FIG. 7 illustrates various components of an example device 700 that can be implemented as any of the devices, or services implemented by devices, described with reference to the previous FIGS. 1-6. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person)

and/or an entity that operates the device such that a device describes logical devices that include users, software, firmware, hardware, and/or a combination of devices.

The device 700 includes communication devices 702 that enable wired and/or wireless communication of device data 704, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 706 via which any type of data, media content, and/or inputs can be received, such as user-selectable inputs, messages, communications, music, television content, recorded video content, and any other type of audio, video, and/or image data received from any content and/or data source.

The device 700 also includes communication interfaces 708, such as any one or more of a serial, parallel, network, or wireless interface. The communication interfaces provide a connection and/or communication links between the device and a communication network by which other electronic, computing, and communication devices communicate data with the device.

The device 700 includes one or more processors 710 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 712. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 700 also includes one or more memory devices (e.g., computer-readable storage media) 714 that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. In embodiments, the a memory device 714 can be implemented as a proxy cache 716.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 714 provides data storage mechanisms to store the device data 704, other types of information and/or data, and various device applications 718. For example, an operating system 720 can be maintained as a software application with a memory device and executed on the processors. The device applications may also include a device manager, such as any form of a control application, software application, signal processing and control module, code that is native to a particular device, a hardware abstraction layer for a particular device, and so on. In this example, applications include a proxy service 722 and a device location service 724, such as when device 700 is implemented as a mobile network operator or server device. The applications also include an advertisement distribution service 726, such as when device 700 is implemented as a content service. The services are shown as software modules and/or computer applications. Alternatively or in addition, the services can be implemented as hardware, software, firmware, fixed logic, or any combination thereof.

The device 700 also includes an audio and/or video processing system 728 that generates audio data for an audio system 730 and/or generates display data for a display system 732. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of current device location advertisement distribution have been described in language specific to features and/or methods, the subject of the appended claims is not necessarily limited to the specific features or methods described. Rather, the specific features and methods are disclosed as example implementations of current device location advertisement distribution.

The invention claimed is:

1. A system, comprising:
a mobile network operator configured to receive television content from a content service, the mobile network operator further configured to communicate the television content to a client device via a wireless distribution point;
a device location service configured to:
determine a geographic region associated with the client device for wireless voice communication;
determine that a current location of the client device is not within the geographic region associated with the client device;
determine an advertising locale that includes the current location of the client device for distribution of the television content to the client device with advertisements that correspond to the advertising locale; and update the current location of the client device based on location data received via wireless data communication that identifies the current location of the client device.

2. A system as recited in claim 1, wherein the geographic region that is associated with the client device is based on at least one of a service contract with a user of the client device or a billing zip code associated with the user of the client device.

3. A system as recited in claim 1, wherein the location data comprises at least one of GPS location data or regional position data that correlates to the current location of the client device.

4. A system as recited in claim 1, wherein the advertisements are targeted local advertisements corresponding to the current location of the client device.

5. A system as recited in claim 1, wherein the advertisements are targeted local advertisements corresponding to the advertising locale that includes the current location of the client device.

6. A system as recited in claim 1, wherein the device location service is further configured to update the advertising locale for the client device as the client device is moved from one region to another.

7. A system as recited in claim 1, wherein the device location service is further configured to update the television content with advertisements that correspond to the advertising locale.

8. A method, comprising:
receiving television content from a content service for distribution to a client device via a wireless distribution point;
determining a geographic region associated with the client device for wireless voice communication;
receiving location data that identifies a current location of the client device;
determining that the current location of the client device is not within the geographic region associated with the client device;
determining an advertising locale that includes the current location of the client device;
updating the television content with advertisements that correspond to the advertising locale; and
communicating the television content along with the advertisements to the client device at the current location of the client device within the advertising locale.

9. A method as recited in claim 8, wherein the geographic region that is associated with the client device is based on at least one of a service contract with a user of the client device or a billing zip code associated with the user of the client device.

10. A method as recited in claim 8, wherein the location data that identifies the current location of the client device comprises at least one of GPS location data or regional position data that correlates to the current location of the client device.

11. A method as recited in claim 8, wherein the television content is updated with the advertisements that are targeted local advertisements corresponding to the current location of the client device.

12. A method as recited in claim 8, wherein the television content is updated with the advertisements that are targeted local advertisements corresponding to the advertising locale that includes the current location of the client device.

13. A method as recited in claim 8, further comprising updating the advertising locale for the client device as the client device is moved from one region to another.

14. A method as recited in claim 8, further comprising caching the received television content prior to communicating the television content along with the advertisements to the client device.

15. A content service, comprising:
a content server configured to distribute television content to a mobile network operator that communicates the television content to a client device via a wireless distribution point, the client device associated with a geographic region for wireless voice communication;
a processor and memory to implement an advertisement distribution service configured to:
receive location data that identifies a current location of the client device;
determine that the current location is not within the geographic region associated with the client device;
determine an advertising locale that includes the current location of the client device; and
update the television content to include advertisements that correspond to the advertising locale within which the client device is located.

16. A content service as recited in claim 15, wherein the location data that identifies the current location of the client device comprises at least one of GPS location data or regional position data that correlates to the current location of the client device.

17. A content service as recited in claim 15, wherein the advertisements are targeted local advertisements corresponding to the current location of the client device.

18. A content service as recited in claim 15, wherein the advertisements are targeted local advertisements corresponding to the advertising locale that includes the current location of the client device.

19. A content service as recited in claim 15, wherein the advertisement distribution service is further configured to update the advertising locale for the client device as the client device is moved from one region to another.

20. A content service as recited in claim 15, wherein the television content is cached at the wireless distribution point.

* * * * *